United States Patent [19]

Carlson

[11] 4,447,799
[45] May 8, 1984

[54] HIGH TEMPERATURE THERMISTOR AND METHOD OF ASSEMBLING THE SAME

[75] Inventor: Richard O. Carlson, Schenectady, N.Y.

[73] Assignee: General Electric Company, Schenectady, N.Y.

[21] Appl. No.: 230,163

[22] Filed: Jan. 30, 1981

[51] Int. Cl.$^3$ .............................................. H01C 7/02
[52] U.S. Cl. ................................. 338/22 R; 29/613; 29/619; 338/322
[58] Field of Search .................. 338/22 R, 225 D, 25, 338/28, 322, 327–329, 332; 29/612, 613, 619, 621; 73/185

[56] References Cited

U.S. PATENT DOCUMENTS

| | | | |
|---|---|---|---|
| 2,418,460 | 4/1947 | Buehler | 338/327 X |
| 2,703,354 | 3/1955 | Wainer | 338/327 X |
| 3,037,180 | 5/1962 | Linz, Jr. | 338/327 |
| 3,221,284 | 11/1965 | Sammerer | 338/25 |
| 3,815,074 | 6/1974 | Nagata | 338/22 R |
| 3,975,307 | 8/1976 | Matsuo et al. | 338/22 R |
| 4,053,864 | 10/1977 | Rodriguez et al. | 338/327 X |
| 4,080,564 | 3/1978 | Nitta et al. | 338/35 X |
| 4,314,230 | 2/1982 | Cardinal et al. | 338/25 X |
| 4,321,577 | 3/1982 | Carlson | 338/35 |

OTHER PUBLICATIONS

T. Nitta & S. Hayakawa, "Ceramic Humidity Sensors", *IEEE Transactions*, vol. CHMT-3, No. 2, Jun. 1980, pp. 237–243. FIG. 7 of this article, as well as accompanying discussion, appeared in Matsushita's National Technical Report in 1978 (in Japanese).

"Product Data", product specification literature of Midwest Components, Inc., of Muskegon, Mich. (One page, double-sided).

"Monolithic Ceramic Capacitors", brochure of Western Thermistor Corporation, of Oceanside, Calif., Identification No. 20K980.

*Primary Examiner*—C. L. Albritton
*Attorney, Agent, or Firm*—Charles E. Bruzga; James C. Davis, Jr.; Marvin Snyder

[57] ABSTRACT

A thermistor suitable for use in a temperature range with a maximum temperature exceeding 400° C. comprises bulk thermistor material with a pair of electrical leads attached to the thermistor material by respective quantities of conductive paste each having a curing temperature substantially in excess of the aforementioned maximum temperature.

21 Claims, 3 Drawing Figures

U.S. Patent
May 8, 1984
4,447,799
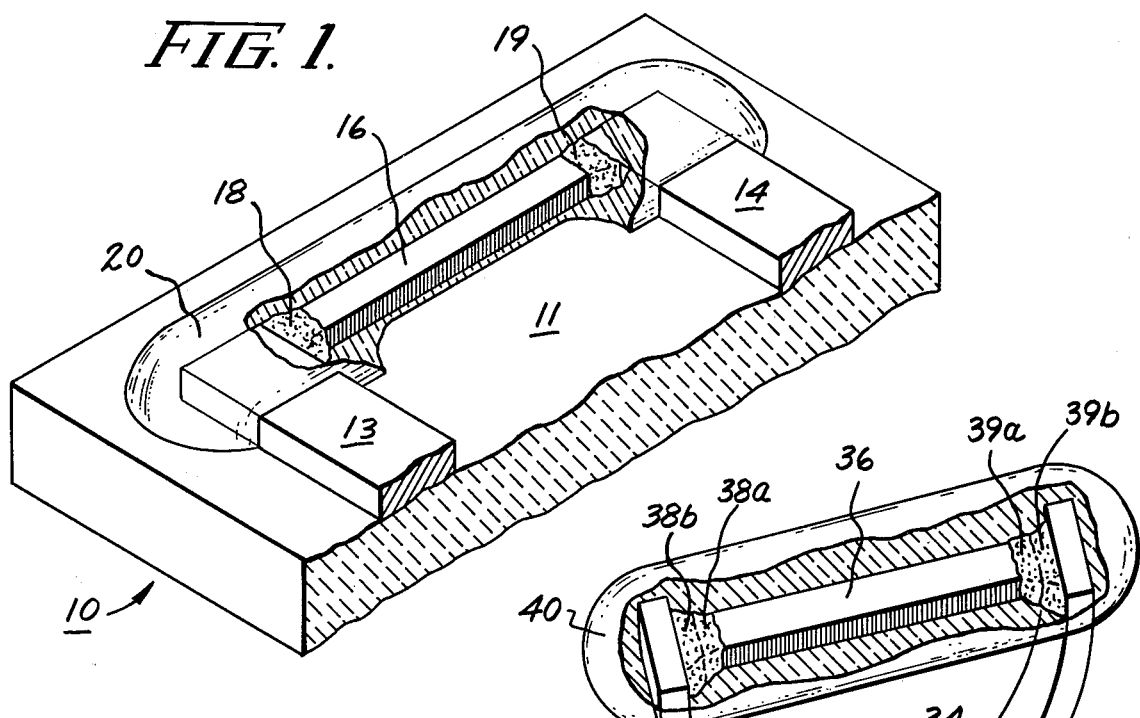
FIG. 1.
FIG. 2.
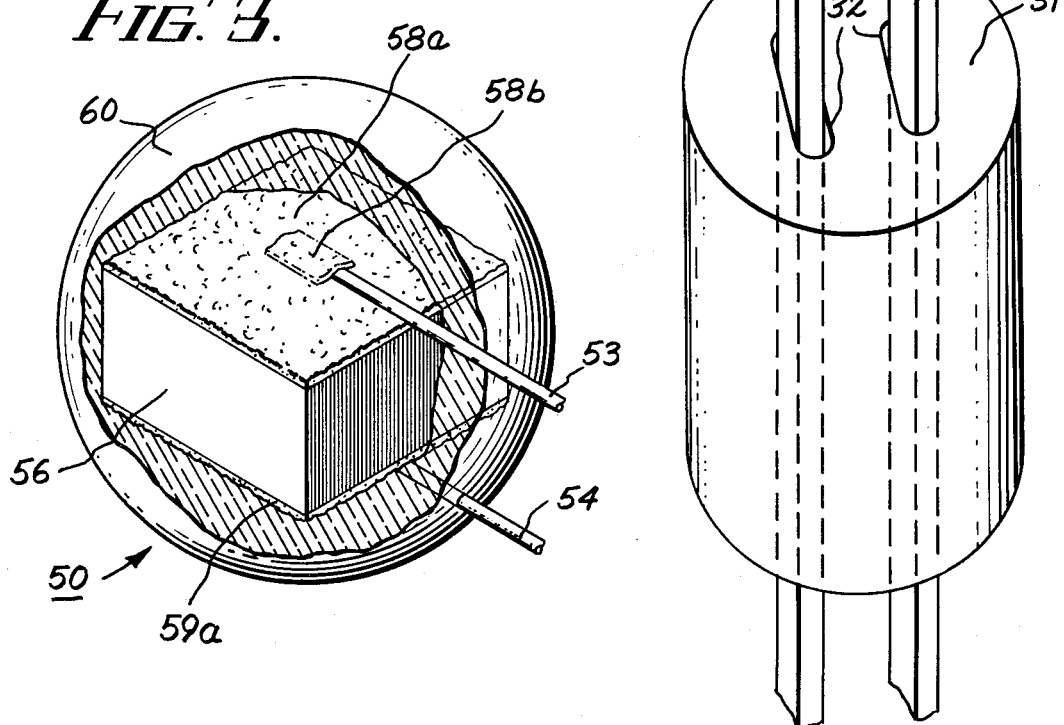
FIG. 3.

HIGH TEMPERATURE THERMISTOR AND METHOD OF ASSEMBLING THE SAME

The present invention relates to a temperature sensor suitable for use at high temperature (that is, greater than 400° C. as used therein) and more particularly, to a high temperature thermistor and a method of assembling such a thermistor.

The state of the art in integrated circuit technology has advanced rapidly since the latter part of the 1960's. As a result of this advance low cost microprocessors on single integrated chips have been made available. Microprocessors are useful for controlling processes heretofore controlled by considerably more expensive, "mainframe" computers. However, microprocessors are also useful for controlling a vast array of processes which have never been subject to control by mainframe computers, due to the cost consideration of using a mainframe computer. The rapidity with which microprocessors pervade this vast array of processes hinges upon, to a significant extent, the state of the art of sensor technology which provides the means for supplying input data reflecting physical conditions of any particular process to a microprocessor. Sensors presently exist for measuring numerous conditions of a process, but many of them are expensive, usually commercial, processes where the cost of the sensors is a minor factor.

One exemplary potential application for the use of a microprocessor is in the control of the thermal condition of consumer ovens for cooking foodstuffs and which incorporate a self-cleaning mode involving an oven temperature of approximately 500° C. Such ovens are produced at a high volume rate. To implement microprocessor control of the thermal condition in such an oven, a high temperature sensor suitable for use up to approximately 500° C. is required. It is desirable that such a high temperature sensor have an electrical stability characterized by providing a high degree of electrical accuracy at 500° C. after operation at such temperature for an extended period of time. Further, a temperature sensor having an initial low cost is required. Additionally, the interchangeability of such a temperature sensor is required to facilitate initial installation thereof and simple replacement of a damaged temperature sensor, without the need for individualized calibration of the microprocessor control circuitry which is responsive to the temperature sensor.

A presently available temperature sensor, suitable for oven use up to 500° C., comprises a thermistor having bulk thermistor material with a pair of platinum leads imbedded therein. The bulk thermistor material, initially in an unfired, powdered state, is formed around the platinum leads and is then fired at a high temperature to produce a finished thermistor. The geometry control or shaping of the initial, powdered thermistor material about the platinum leads is a rather imprecise act. Consequently, a thermistor produced by this method has an electrical characteristic which is not likely to conform accurately to a standard electrical characteristic. This means that such a thermistor generally lacks interchangeability with other so produced thermistors. This also means that the electrical characteristic of such a thermistor must be individually measured for grading purposes. Consequently, such a thermistor is an expensive item.

Other thermistors presently available do provide for interchangeability but are not suitable for operation at 500° C. These thermistors attain interchangeability due to precise geometry control of the thermistor material thereof in their manufacture. This may be accomplished, for example, by precision cutting such thermistor material from a wafer of thermistor material of a standard grade. One such thermistor provides for attachment of copper leads to bulk thermistor material with soft solder. Such soft solder is subject to fusing and thus failure at temperatures above 150° C. Another of these thermistors having interchangeability provides for the attachment of Dumet leads to bulk thermistor material with silver. The bulk thermistor material and Dumet leads are then encapsulated in glass. Such thermistor is subject to structural failure above about 400° C.

OBJECTS OF THE INVENTION

Accordingly, it is an object of this invention to provide a low cost and interchangeable thermistor suitable for use at high temperature.

It is a further object of this invention to provide a low cost and interchangeable thermistor exhibiting a high degree of electrical stability at high temperature.

Further objects and advantages of the present invention will become apparent from a reading of the remainder of this specification with reference to the drawing figures.

SUMMARY OF THE INVENTION

In carrying out the objects of the invention in one form, there is provided a thermistor suitable for use in a temperature range with a maximum temperature exceeding 400° C. The thermistor comprises thermistor material, first and second leads, and first and second, fired, preferably homogeneous quantities of conductive paste. The first, fired quantity of conductive paste conductively connects and adheres the first lead to a first location on the exterior of the thermistor material in the normal temperature range encountered thereby. The second, fired quantity of conductive paste conductively connects and adheres the second lead to a second location on the exterior of the thermistor material in the normal temperature range encountered thereby. The first and second quantities of conductive paste each have a curing temperature substantially in excess of the aforementioned maximum temperature. Advantageously, the thermistor material can comprise a standard grade of material and have a standard size and shape, whereby the thermistor can possess the feature of interchangeability.

In carrying out the invention in another form, there is provided a method of assembling a thermistor suitable for use in a temperature range with a maximum temperature exceeding 400° C. In accordance with this method, a first quantity of conductive paste in an unfired state is applied to a first location on the exterior of thermistor material and to a first lead. A second quantity of conductive paste in an unfired state is likewise applied to a second location on the exterior of the thermistor material and to a second lead. The foregoing quantities of conductive paste are then fired at a temperature and for a length of time sufficient to cure the quantities of conductive paste, this temperature substantially exceeding the aforementioned maximum temperature.

BRIEF DESCRIPTION OF THE DRAWING

FIG. 1 is an enlarged perspective view of an assembled thermistor in accordance with a first embodiment of the invention;

FIG. 2 is an enlarged perspective view of an assembled thermistor in accordance with a second embodiment of the invention; and FIG. 3 is an enlarged perspective view of an assembled thermistor in accordance with a third embodiment of the invention.

DETAILED DESCRIPTION

There is shown in FIG. 1 a thermistor 10 according to a first embodiment of the present invention. The thermistor 10 comprises a ceramic substrate 11, first and second electrical leads 13 and 14, bulk thermistor material 16, first and second quantities of conductive paste 18 and 19, and a glass overcoat 20, shown as partially broken away. Specific, exemplary materials for the foregoing parts are as follows.

The ceramic substrate 11 comprises alumina or beryllia, which has a higher thermal conductivity than alumina. The first and second leads 13 and 14 comprise Fernico ribbon with cross-sectional dimensions of 10 by 30 mils. The bulk thermistor material 16 comprises "Curve 1" thermistor material with a resistivity of 2,000 ohm-cm, sold by Western Thermistor Corporation of Oceanside, Calif. The Curve 1 thermistor material is comprised of a sintered mixture of oxides of manganese and nickel and is more fully described as to its electrical (resistance versus temperature) characteristic in a 1980 brochure entitled Monolithic Ceramic Thermistors, identified by the code 20K980, distributed by Western Thermistor Corporation, and incorporated herein by reference. The dimensions of this material 16 are approximately 100 mils by 10 mils by 8 mils, whereby the thermistor 10 has approximately 200 ohms resistance and 1 megohm resistance at 500° C. and 25° C., respectively. The first and second quantities of conductive paste 18 and 19 comprise Birox ® resistor composition No. 9318, a product of E. I. du Pont de Nemours & Co. (Inc.). Before firing, the Birox ® resistor composition is in the form of a thick film paste comprising primarily bismuth ruthenate and further comprising a glass with a high fusing temperature and a binder. Lastly, the glass overcoat 20 comprises any conventional glass having a curing temperature in excess of the maximum temperature of operation of the thermistor 10 and having a thermal expansion coefficient substantially matched to the thermal expansion coefficients of the thermistor material 16, the conductive paste 18 and 19, and the ceramic substrate 11 in the temperature range encountered thereby during assembly and normal operation of the thermistor 10.

A typical procedure for assembling the thermistor 10 starts with securing the first and second leads 13 and 14 to the upper surface of the ceramic substrate 11 (as viewed in FIG. 1) by any suitable means, such as by brazing. Next, a first quantity of conductive paste 18, in an unfired state, is applied to a first location on the exterior surface of the thermistor material 16 and to the first lead 13. Likewise, a second quantity of conductive paste 18, in an unfired state, is applied to a second location on the exterior surface of the thermistor material 16 and to the second lead 14. The thickness of each of the first and second quantities of conductive paste 18 and 19, between the respective first and second locations on the exterior of the thermistor 16 and the first and second leads 13 and 14, is about a few mils. The foregoing first and second locations on the exterior of the thermistor material 16 comprise the ends of the specific, elongated form of thermistor material 16 shown. It may be desirable to have the thermistor material 16 disposed somewhat above the upper surface of the ceramic substrate 11, as shown. This allows the glass overcoat 20 (discussed below) to surround the thermistor material 16. Any possible adverse reaction between the thermistor material 16 and the ceramic substrate 11 would thus be avoided. The next step in the assembly of the thermistor 10 is to fire it in an oven in order to cure the conductive paste 18 and 19. This is suitably accomplished with the Birox ® resistor composition by firing the thermistor 10 to between 800° and 850° C. for a duration of approximately 10 to 20 minutes. When cured, the conductive paste 18 and 19 serves to provide respective conductive connections and structural adherence between the first and second locations on the exterior of the thermistor material 16 and the first and second leads 13 and 14 in the normal temperature range encountered thereby.

As a final step in assembling the thermistor 10, the glass overcoat 20 is provided. The glass overcoat 20, initially is an unfired, paste form, is applied over and suitably around the thermistor material 16, the conductive paste 18 and 19 and proximate portions of the leads 13 and 14. The thermistor 10 is then fired at a temperature sufficient to fuse or cure the glass 20, such temperature being higher than the temperature encountered during normal operation of the thermistor 10.

In view of the foregoing firing step of the glass overcoat 20, the initial step of firing the conductive paste 18 and 19 can be modified as follows. The conductive paste 18 and 19, initially in an unfired state, can be fired to a temperature of approximately 400° C. for approximately 30 minutes. Then, the foregoing step of firing the glass overcoat 20 is performed. The firing step for the glass overcoat 20 is accomplished by firing the thermistor 10 as described above for curing the Birox ® resistor composition, whereby both the glass overcoat 20 and the Birox ® resistor composition (that is, the conductive paste 18 and 19) are cured. This firing step presupposes, of course, that the glass overcoat 20 is susceptible of being fired and thereby cured with the firing conditions for the Birox ® resistor composition.

The maximum temperature which the thermistor 10 can measure with reasonable accuracy is dependent on the capacity of the various parts thereof to function in accordance with the teaching of this entire document at such maximum temperature. Those skilled in the art will be able to ascertain the maximum temperature based upon knowledge of such capacity of the various parts.

The thermistor 10 is readily adaptable to possessing the feature of interchangeability, as discussed above. This is due to the fact that the thermistor material 16 can be comprised of a standard or predetermined grade of thermistor material having a standard or predetermined size and shape. Advantageously, the thermistor material 16 is precision cut from a wafer of thermistor material of a standard grade. With the thermistor material 16 thus conforming to a standard grade, size, and shape, a control system responsive to the thermistor 10, such as one utilizing microprocessor control, need be calibrated to just one, standard, electrical characteristic. This simplifies the initial installation of a thermistor 10, especially in a mass production assembly line, and correspondingly simplifies the replacement of a nonfunctioning thermistor 10 with another thermistor 10.

The thermistor 10 is particularly suitable for assembly in batches. This is due to the following reason. The ceramic substrate 11 can originally be part of a large wafer of such ceramic. Many thermistors 10 can then be assembled on the large wafer. The individual thermistors 10 can then be cut from the large wafer of ceramic assembled form. By assembling thermistors 10 in batches, the per unit cost of a thermistor 10 is minimized.

Alternative materials for the above-identified, specific, exemplary materials for the leads 13 and 14, the thermistor material 16, and the conductive paste 18 and 19 should conform to the following requirements (in addition to those which will be apparent from a consideration of this entire document). First, the just-mentioned materials have substantially matched thermal expansion coefficients in the temperature range encountered thereby during assembly and normal operation of the thermistor 10. This is a requirement to assure the structural integrity of a thermistor 10. Second, the conductive paste 18 and 19 has a curing temperature substantially in excess of the maximum temperature at which the thermistor 10 is suitably used. This is a requirement to assure that the conductive paste 18 and 19 doesn't deteriorate at such maximum temperature. Third, the conductive paste 18 and 19 has a stable conductivity in the temperature range encountered thereby during normal operation of the thermistor 16. The criterion for "stable" conductivity is that the conductivity of the paste 18 and 19 must remain relatively high compared to that of the thermistor material 16, as will be apparent to those skilled in the art. Such stable conductivity of the paste 18 and 19 is a requirement in order to prevent the conductivity of the paste 18 and 19 from unduly interfering with the conductivity of the thermistor material 16, whereby the electrical characteristic of the thermistor 10 would become degraded. Fourth, the conductive paste 18 and 19 is substantially chemically inert with respect to the thermistor material 16 and to the leads 13 and 14. This is a requirement to prevent degradation of the electrical connections provided by the paste 18 and 19. Fifth, and last, the leads 13 and 14 have appropriate dimensions, considering the material from which they are formed, whereby they are impervious to material oxidization in the environment encountered thereby during assembly and normal operation of the thermistor 10. What is meant by "material oxidization" is oxidation so extreme that it penetrates either lead 13 or 14 to such an extent that the current carrying cross section thereof is reduced to an unacceptable level. This is a requirement to prevent undue increase in the resistance of the leads 13 and 14 which would degrade the electrical characteristic of the thermistor 10.

Alternative materials for the leads 13 and 14, the thermistor material 16, and the conductive paste 18 and 19 can be used, provided that they conform to the requirements discussed in the preceeding paragraph in addition to those which will be apparent from a consideration of this entire document. The following alternative materials are given by way of example. The leads 13 and 14 can comprise Kovar ® wire or ribbon, platinum wire, or a conductive paste suitable for "screening-" onto the ceramic substrate, such as Birox ® resistor composition having a high conductivity relative to that of the thermistor material 16. The thermistor material 16 can comprise "Grade 1" material from Midwest Components, Inc. of Muskegon, Mich. and which is described in their product specification literature entitled Product Data and incorporated herein by reference. Finally, the conductive paste 18 and 19 can be in the form of a thick film paste which is commercially available and which comprises primarily ruthenium oxide and further comprises glass with a high fusing temperature and a binder.

Turning to FIG. 2, there is shown a thermistor 30 according to a second embodiment of the present invention. The thermistor 30 comprises a ceramic sleeve 31, first and second electrical leads 33 and 34, bulk thermistor material 36, first and second layers of conductive paste 38a and 38b, and a glass overcoat 40, shown as partially broken away. These parts correspond to, and are governed by, the properties and dimensions of the parts discussed above for the thermistor 10, as follows:

| THERMISTOR 30 | THERMISTOR 10 |
| --- | --- |
| Leads 33 and 34 | Leads 13 and 14 |
| Thermistor material 36 | Thermistor material 16 |
| Conductive paste 38a, 38b, 39a and 39b | Conductive paste 18 and 19 |
| Glass overcoat 40 | Glass overcoat 20 |

A typical method for assembling the thermistor 30 comprises applying the first layer of conductive paste 38a, in an unfired state, to a first location on the exterior surface of the thermistor material 36. Likewise, the third layer of conductive paste 39a is applied to a second location on the exterior surface of the thermistor material 36. The thickness of each of the first and third layers of conductive paste 38a and 39a is about a few mils. The foregoing first and second locations on the exterior of the thermistor material 36 comprise the ends of the specific, elongated form of thermistor material 36 shown. The next step in the assembly of the thermistor 30 is to fire it in an oven in order to cure the first and third layers of conductive paste 38a and 39a, using the same procedure as for curing the conductive paste 18 and 19 in the assembly of the thermistor 10, discussed above. Next, the first and second leads 33 and 34 are each inserted through a respective one of the holes 32 in the ceramic sleeve 31. The second and fourth layers of conductive paste 38b and 39b, in an unfired state, are then applied over the first and third layers of conductive paste 38a and 39a, respectively. Thereupon, the first and second leads 33 and 34 are positioned in a pressing relation over the second and fourth layers of conductive paste 38b and 39b, respectively. These layers of conductive paste 38b and 39b are then fired in order to cure them, in the same manner as for firing the conductive paste 18 and 19 of the thermistor 10, discussed above. Finally, the glass overcoat 40, initially in an unfired, paste state, is applied over the thermistor material 36, the conductive paste 38a, 38b, 39a and 39b, and the proximate portions of the leads 33 and 34, and is then fired according to the procedure used for firing the glass overcoat 20 of the thermistor 10.

With the exception of the suitability for assembly in batches of the thermistor 10, the thermistor 30 attains the same objectives as those described above for the thermistor 10.

Turning to FIG. 3, there is shown a thermistor 50 according to a third embodiment of the invention. The thermistor 50 comprises first and second electrical leads 53 and 54, bulk thermistor material 56, first and second layers of conductive paste 59a and 59b (not shown, but symmetrical to 58b with respect to the thermistor material 56), and a glass overcoat 60, shown as partially broken away. Various of these parts correspond to, and are governed by, the properties and dimensions of the parts discussed above for the thermistor 10 (except as noted) as follows:

| THERMISTOR 50 | THERMISTOR 10 |
|---|---|
| First and second electrical leads 53 and 54 | First and second electrical leads 13 and 14 |
| Thermistor material 56 | Thermistor material 16 |
| Conductive paste 58a, 58b, 59a, and 59b (not shown) | Conductive paste 18 and 19 |
| Glass overcoat 60 | Glass overcoat 20 |

The particular first and second electrical leads 53 and 54 illustrated advantageously comprise flexible wire of approximately 5 mils diameter, and are suitably formed of platinum. Further, the thermistor material 56 has a size and shape selected to provide a practical value of impedance at the maximum temperature at which it is normally operated.

A typical procedure for assembling the thermistor 50 starts with a large wafer (not shown) of thermistor material from which the thermistor material 56 is eventually cut. The first and third layers of conductive paste 58a and 59a are then applied in an unfired state to the opposite, major surfaces of the wafer. Advantageously, at this point, these first and third layers of conductive paste 58a and 59a cover considerably more area on the foregoing surfaces of the wafer than as shown in the assembled thermistor 50. The conductive paste 58a and 59a is then fired to provide curing thereof, using the same procedure as described above for curing the conductive paste 18 and 19 of the thermistor 10. At this point, the thermistor material 56, with the fired layers of conductive paste 58a and 59a thereon, is cut from the wafer of thermistor material. Next, the first and second leads 53 and 54 are positioned, respectively, onto the first and third layers of conductive paste 58a and 59a. The ends of the leads 53 and 54 are then covered, respectively, with the second and fourth layers of conductive paste 58b and 59b. These layers of conductive paste 58b and 59b are then fired to provide curing thereof, using the same procedure as described above for the firing of the conductive paste 18 and 19 of the thermistor 10. When cured, the first and second layers of conductive paste 58a and 58b provide a conductive connection and adherence between the first lead 53 and a first, major surface of the thermistor material 56. Likewise, when cured, the third and fourth layers of conductive paste 59a and 59b provide a conductive connection and structural adherence between the second lead 54 and a second, major surface of the thermistor material 56. As a final step in the assembly of the thermistor 50, the glass overcoat 60, initially in an unfired, paste form, is placed over the thermistor material 56, all the exposed portions of the layers of conductive paste 58a, 58b, 59a and 59b, and the proximate portions of the leads 53 and 54. The glass overcoat 60 is then fired according to the procedure used for firing the glass overcoat 20 of the thermistor 10.

With the exception of the suitability for assembly in batches of the thermistor 10, the thermistor 50 attains the same objectives as those described above for the thermistor 10. Additionally, a thermistor 50 comprising either the above-mentioned, Curve 1 material or Grade 1 material is characterized by having a high degree of electrical stability after operation at a high temperature for an extended period of time. Quantitatively, such a thermistor 50 typically provides a temperature measurement which is accurate to within $\pm 2°$ C. after operation at 500° C. for 1,000 hours. This characteristic is especially desirable, for instance, where the thermistor 50 is used to sense temperature in a cooking oven which incorporates a self-cleaning mode utilizing a temperature of about 500° C. It will be apparent to those skilled in the art that the above thermistors 10 and 30, by using either the above-mentioned Curve 1 material or Grade 1 material, can likewise attain the same high degree of electrical stability. However, with the thermistor 10 precaution must be taken to insure that no adverse reaction occurs between the ceramic substrate 11 and the thermistor material 16. Having the glass overcoat 20 separate the ceramic substrate 11 from the thermistor material 16, as suggested above, would be an adequate precaution.

While the invention has been described with respect to specific embodiments, modifications thereof will occur to those skilled in the art. For example, rather than utilizing only a single layer of conductive paste 18 or 19 in assembling the thermistor 10, an additional layer or layers can be provided. These and all such modifications are deemed to fall within the true spirit and scope of the invention as defined in the appended claims.

What I claim as my invention and desire to have secured by Letters Patent of the United States is:

1. A thermistor suitable for use in a temperature range with a maximum temperature exceeding 400° Centigrade, comprising:
   (a) thermistor material;
   (b) first and second leads;
   (c) a first, fired, homogeneous quantity of conductive paste conductively connecting and adhering said first lead to a first location on the exterior of said thermistor material in the normal temperature range encountered thereby; and
   (d) a second, fired, homogeneous quantity of conductive paste conductively connecting and adhering said second lead to a second location on the exterior of said thermistor material in the normal temperature range encountered thereby;
   (e) said thermistor material, said leads, and said fired quantities of conductive paste having substantially matched thermal expansion coefficients in the normal temperature range encountered thereby;
   (f) said leads being impervious to material oxidation in the environment encountered thereby during assembly and normal operation of the thermistor; and
   (g) said fired quantities of conductive paste each having a curing temperature substantially in excess of said maximum temperature, each having a stable conductivity in the temperature range encountered thereby during operation of the thermistor, and each being substantially chemically inert with respect to said thermistor material and to said leads in the temperature range encountered thereby during assembly and normal operation of the thermistor.

2. The thermistor defined in claim 1 wherein said first and second, fired quantities of conductive paste each comprise a singular layer of conductive paste.

3. The thermistor defined in claim 1 wherein said first, fired quantity of conductive paste comprises a first, fired layer of conductive paste disposed on said first location on the exterior of said thermistor material and a second, fired layer of conductive paste disposed between said first layer of conductive paste and said first lead; and wherein said second, fired quantity of conductive paste comprises a third, fired layer of conductive paste disposed on said second location on the exterior of said thermistor material and a fourth, fired layer of conductive paste disposed between said third layer of conductive paste and said second lead.

4. The thermistor defined in claim 1 wherein said first, fired quantity of conductive paste comprises a first, fired layer of conductive paste disposed on said first location on the exterior of said thermistor material and a second fired layer of conductive paste disposed in part over a portion of said first lead and in part over said first, fired layer of conductive paste; and wherein said second, fired quantity of conductive paste comprises a third, fired layer of conductive paste disposed on said second location on the exterior of said thermistor material and a fourth, fired layer disposed in part over a portion of said second lead and in part over said third, fired layer of conductive paste.

5. The thermistor defined in claim 1 wherein said conductive paste primarily comprises bismuth ruthenate.

6. The thermistor defined in claim 5 wherein said conductive paste further comprises a glass and a binder.

7. The thermistor defined in claim 6 wherein said conductive paste comprises Birox resistor composition.

8. The thermistor defined in claim 1 wherein said conductive paste primarily comprises ruthenium oxide.

9. The thermistor defined in claim 8 wherein said conductive paste further comprises a glass and a binder.

10. The thermistor defined in claim 1 wherein said thermistor material comprises a predetermined grade of thermistor material and has a predetermined size and shape.

11. The thermistor defined in claim 2 further comprising a ceramic substrate onto which said first and second leads are secured.

12. The thermistor defined in claim 2 wherein said leads comprise a ribbon-shaped conductor.

13. The thermistor defined in claim 3 further comprising a ceramic sleeve having a pair of holes through which said first and second leads are respectively inserted.

14. The thermistor defined in claim 3 wherein said first and second leads are respectively positioned in a pressing relation over said second and fourth, fired layers of conductive paste.

15. The thermistor defined in claim 3 wherein said leads each comprise a ribbon-shaped conductor.

16. The thermistor defined in claim 4 wherein said thermistor material comprises a rectangular-solid of thermistor material cut from a wafer of such material.

17. The thermistor defined in claim 4 wherein said leads comprise flexible wire.

18. The thermistor defined in claim 1 further comprising a glass overcoat encapsulating said thermistor material, said fired quantities of conductive paste, and proximate portions of said leads.

19. A thermistor suitable for use in a temperature range with a maximum temperature exceeding 400° Centigrade, comprising:
(a) thermistor material;
(b) first and second leads;
(c) a first, fired quantity of conductive paste conductively connecting and adhering said first lead to a first location on the exterior of said thermistor material in the normal temperature range encountered thereby; and
(d) a second, fired quantity of conductive paste conductively connecting and adhering said second lead to a second location on the exterior of said thermistor material in the normal temperature range encountered thereby;
(e) said thermistor material, said leads, and said fired quantities of conductive paste having substantially matched thermal expansion coefficients in the normal temperature range encountered thereby;
(f) said leads being impervious to material oxidation in the environment encountered thereby during assembly and normal operation of the thermistor; and
(g) said fired quantities of conductive paste each primarily comprising bismuth ruthenate, each further comprising a glass and a binder, each having a curing temperature substantially in excess of said maximum temperature, each having a stable conductivity in the temperature range encountered thereby during operation of the thermistor, and each being substantially chemically inert with respect to said thermistor material and to said leads in the temperature range encountered thereby during assembly and normal operation of the thermistor.

20. The thermistor defined in claim 19 wherein said fired quantities of conductive paste each comprise Birox resistor composition.

21. The thermistor defined in claim 19 further comprising a glass overcoat encapsulating said thermistor material, said fired quantities of conductive paste, and proximate portions of said leads.

* * * * *